(12) United States Patent
Pinter (10) Patent No.: US 9,857,554 B2
(45) Date of Patent: Jan. 2, 2018

(54) SPRING CLIPS FOR MOUNTING OPTICS STRUCTURES ON AN ASSOCIATED CIRCUIT BOARD, AND ASSEMBLIES INCLUDING THE SPRING CLIPS

(71) Applicant: Smart Vision Lights, Muskegon, MI (US)

(72) Inventor: Gilbert Pinter, Muskegon, MI (US)

( * ) Notice: Subject to any disclaimer, the term of this patent is extended or adjusted under 35 U.S.C. 154(b) by 0 days.

(21) Appl. No.: 15/073,290

(22) Filed: Mar. 17, 2016

(65) Prior Publication Data

US 2016/0274327 A1  Sep. 22, 2016

Related U.S. Application Data

(60) Provisional application No. 62/134,568, filed on Mar. 18, 2015, provisional application No. 62/147,186, filed on Apr. 14, 2015.

(51) Int. Cl.
*G02B 7/02* (2006.01)
*B23K 1/08* (2006.01)

(52) U.S. Cl.
CPC ............. *G02B 7/026* (2013.01); *G02B 7/028* (2013.01); *B23K 1/085* (2013.01); *G02B 7/023* (2013.01)

(58) Field of Classification Search
CPC .......... G02B 7/028; G02B 7/008; G02B 7/02; G02B 7/021; G02B 7/026

USPC .................................................. 359/818–820
See application file for complete search history.

(56) References Cited

U.S. PATENT DOCUMENTS

| | | | | |
|---|---|---|---|---|
| 2,623,989 A | * | 12/1952 | Lehmann | 362/255 |
| 3,629,639 A | * | 12/1971 | McClure et al. | 33/791 |
| 7,072,184 B2 | * | 7/2006 | Kalyandurg | 361/704 |
| 2008/0224166 A1 | * | 9/2008 | Glovatsky | F21S 48/115 257/99 |
| 2008/0225529 A1 | * | 9/2008 | Van De Poel | 362/310 |
| 2009/0154166 A1 | * | 6/2009 | Zhang | F21K 9/00 362/294 |
| 2011/0122643 A1 | * | 5/2011 | Spork | F21S 48/1104 362/549 |

\* cited by examiner

*Primary Examiner* — James Greece
(74) *Attorney, Agent, or Firm* — James E. Shultz Jr.

(57) ABSTRACT

Clips are provided to secure optic element systems to a printed circuit board. Associated mounting systems may, for example, eliminate direct adhesion of an optic element to an associated illumination source (e.g., LED). Thereby, thermal management of the system may be improved, adding flexibility in, for example, mounting height and tilt of an optic element. Thus, manufacturing cost, associated with mounting optic elements to L.E.D. arrays, may be reduced. Associated mounting systems may enable a direct electrical connection from a printed circuit to, for example, optical path control elements embedded within an optic element using, for example, various electro-optical control technologies.

20 Claims, 6 Drawing Sheets

SPRING CLIPS FOR MOUNTING OPTICS STRUCTURES ON AN ASSOCIATED CIRCUIT BOARD, AND ASSEMBLIES INCLUDING THE SPRING CLIPS

CROSS REFERENCE TO RELATED APPLICATIONS

This application claims the benefit of U.S. Provisional Patent Application Ser. No. 62/134,568, filed Mar. 18, 2015, and 62/147,186, filed Apr. 14, 2015, the disclosures of which are incorporated by reference in their entirety.

TECHNICAL FIELD

The present disclosure generally relates to optic element mounting clips. More particularly, the present disclosure relates to clips for securing an optic element to a substrate.

BACKGROUND

Optic elements are used to focus and otherwise control light emitted from an associated light source, and/or to collect light for projection onto an associated camera or other light sensor. Known mechanisms for mounting an optic element system (e.g., a lens, or lenses) proximate a light source, such as a light emitting diode (LED), a light sensor, or a camera include adhesives, complex snap-in optic element assemblies, optic element holders, pressure fit optic within a holder, etc. For example, an optic element may be affixed to a LED. body assembly using various adhesives, or the optic element may be captured in a machined optic element assembly in a fashion of expensive camera optics.

Known optic element assemblies are both expensive and inflexible with regard to an ability to modify properties of emitted radiation. Furthermore, known optic element assemblies require additional mechanical mounting aids when used on a single or multiple array of light sources or light sensors. Moreover, light sources or light sensors are often, themselves, mounted to a printed circuit board, while an associated optic element may not be connected to the printed circuit board at all.

SUMMARY

An optic element mounting system may include at least two clips adhered to a substrate. The at least two clips may be configured to receive an optic element between the at least two clips and to secure the optic element to the substrate. The at least two clips may be further configured to align the optic element with at least one of: a light source or a camera.

In another embodiment, an optic element mounting clip may include a mounting foot for securing the clip to a substrate. The clip may also include at least one spring loaded portion. The spring loaded section may be configured to deflect in position as an optic element is positioned proximate the clip. The clip may further include an optic element latch. The optic element latch may be configured to engage an optic element engagement of the optic element.

In a further embodiment, a method of manufacturing an optical element mount may include adhering at least two clips to a substrate. The at least two clips may be configured to secure an optical element proximate a substrate.

DETAIL DESCRIPTION

An optic element mounting system may is provided to, for example, secure an optic element (e.g., a lens, or lenses) proximate an associated light emitter (e.g., light emitting diode) or a light sensor (e.g., a single light sensor, or an array of light sensors in a camera). The optic element mounting system may include at least two clips manufactured from, for example, a metallic material having a tensile strength and ductility similar to a spring. Each clip may be adhered to an associated substrate (e.g., a printed circuit board). For example, a clip may include a metallurgy that allows solder-bonding of the clip to a conductive trace on a printed circuit board using conventional reflow or wave soldering as used in common electrical circuit board assembly. Each clip may be formed into a desired shape to capture a respective edge of an associated optic element, and to secure the optic element to the substrate proximate the light emitter or light sensor.

Figure 1:
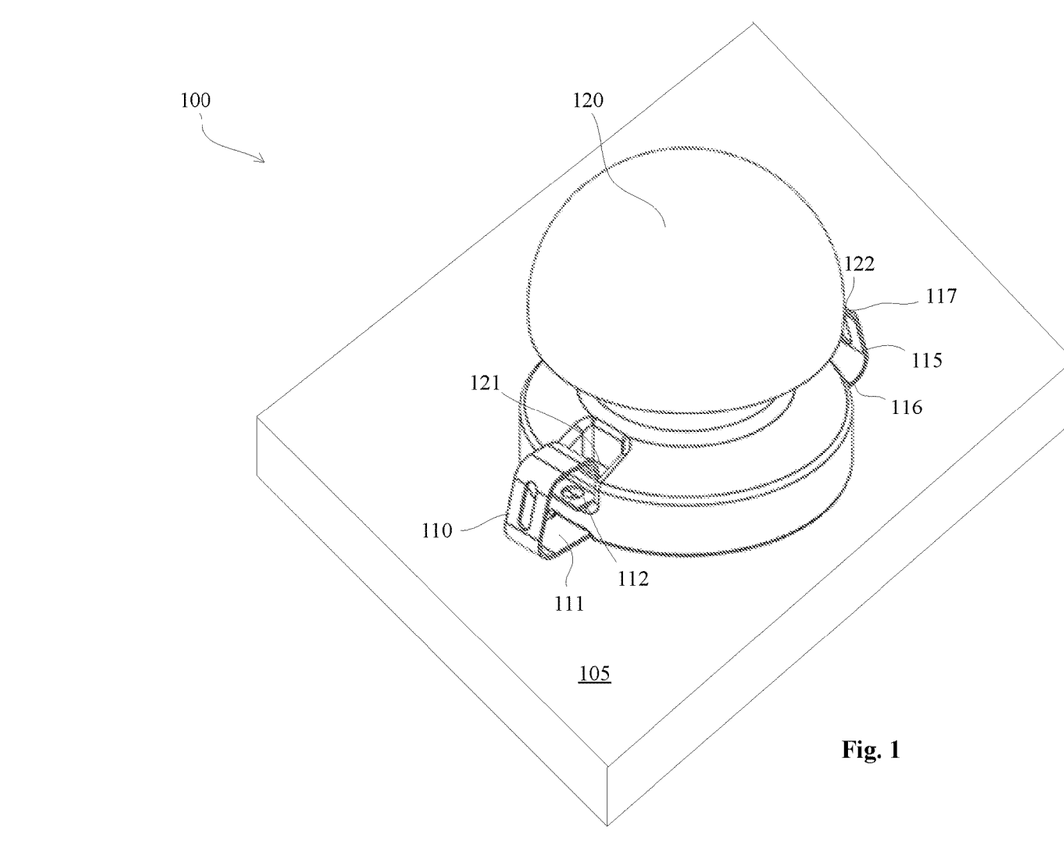
FIG. 1 depicts a perspective view of an example assembly including a compound optic element secured to a circuit board via spring clips.

Turning to FIG. 1, an example optic element mounting system 100 may include a complex optic element 120 secured to a substrate 105 via, for example, a first clip 110 and a second clip 115. The optic element 120 may include a first optic element engagement 121 and a second optic element engagement 122. The first clip 110 may include a clip mounting foot 111 for adhering the first clip 110 to the substrate 105. Similarly, the second clip 115 may include a clip mounting foot 116 for adhering the second clip 115 to the substrate 105. The first clip 110 may include an optic element latch 112, configured to interact with the first optic element engagement 121, and the second clip 115 may include an optic element latch 117, configured to interact with the second optic element engagement 122, such that, when the first optic element engagement 121 and the second optic element engagement 122 of the optic element 120 are positioned between the first clip 110 and the second clip 115, the optic element latch 112 engages the first optic element engagement 121 and the optic element latch 117 engages the second optic element engagement 122. Thereby, the optic element 120 is secured to the substrate 105.

The optic element mounting system 100 may, for example, secure the optic element 120 (e.g., a lens, or lenses) proximate an associated light emitter (e.g., light emitting diode) or a light sensor (e.g., a single light sensor, or an array of light sensors in a camera). The first clip 110 and the second clip 115 may be manufactured from, for example, a metallic material having a tensile strength and ductility similar to a spring, thereby, removably securing the optic element 120 proximate the substrate 105. The first clip 110 and/or the second clip 115 may be adhered to the substrate 105 (e.g., a printed circuit board) by solder-bonding the clip 110, 115 to a conductive trace (not shown in FIG. 1) on the substrate 105 using conventional reflow or wave soldering as used in common electrical circuit board assembly.

While the optic element mounting system 100 is shown to include two clips 110, 115, a similar optic element mounting system may include any number of clips (e.g., three clips, four clips, etc.). The clips may be arranged to hold an optic element in proper optical alignment over an associated light source or light sensor.

The clips 110, 115 may be positioned on the substrate 105 using standard surface mount circuit board manufacturing machines, and the clips 110, 115 may be soldered to, or otherwise adhered to, the substrate. An optic element 120 may be manufactured from silicone materials (e.g., class MS1002 silicon, or its equivalent) as, for example, described in U.S. provisional patent application Ser. No. 62/147,186, the disclosure of which is incorporated herein in its entirety by reference.

Figure 2:
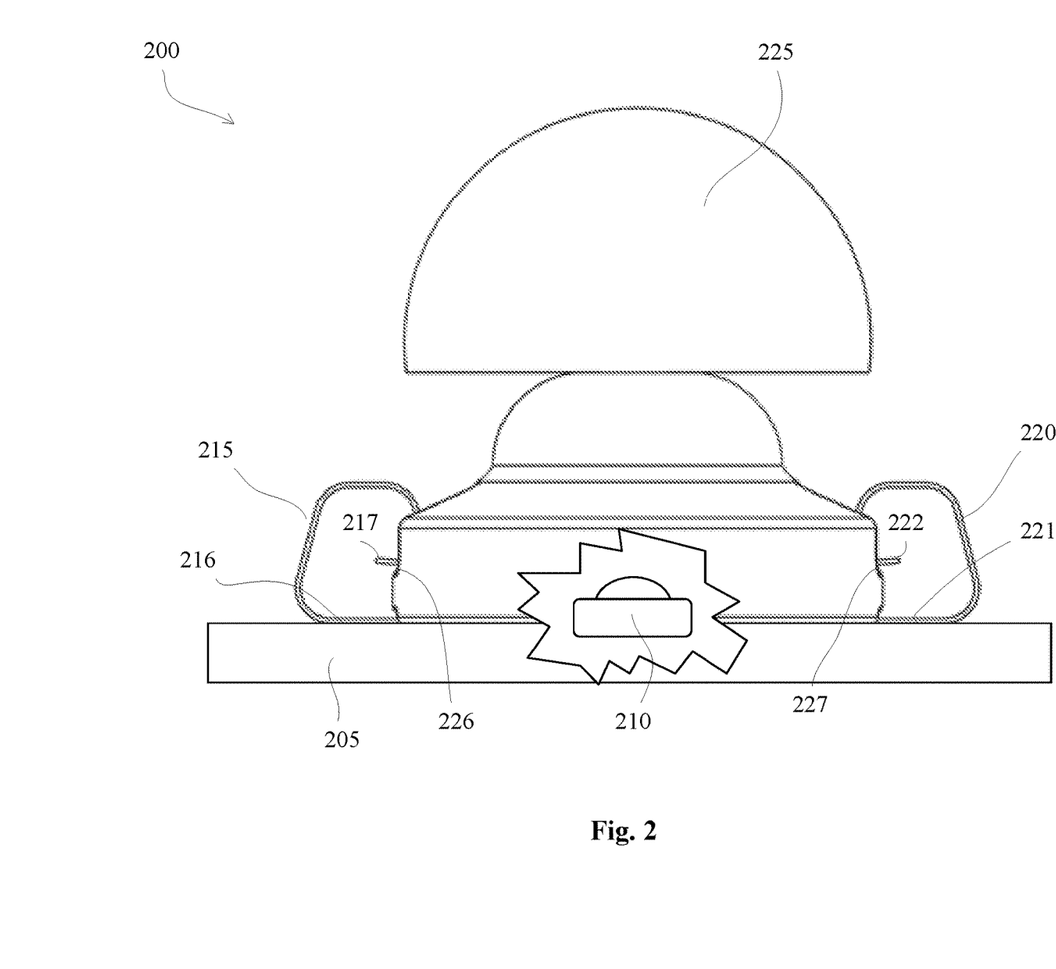
FIG. 2 depicts a profile view of an example assembly including a compound optic element secured to a circuit board via spring clips.

With reference to FIG. 2, an example optic element mounting system 200 may include an optic element 225 secured, proximate a light source 210, to a substrate 205 via, for example, a first clip 215 and a second clip 220. The optic element mounting system 200 may be similar to, for example, the optic element mounting system 100 of FIG. 1. The optic element 225 may include a first optic element engagement 226 and a second optic element engagement 227. The first clip 215 may include a clip mounting foot 216 for adhering the first clip 215 to the substrate 205. Similarly, the second clip 220 may include a clip mounting foot 221 for adhering the second clip 220 to the substrate 205. The first clip 215 may include an optic element latch 217, configured to interact with the first optic element engagement 226, and the second clip 220 may include an optic element latch 222, configured to interact with the second optic element engagement 227, such that, when the first optic element engagement 226 and the second optic element engagement 227 of the optic element 225 are positioned between the first clip 215 and the second clip 220, the optic element latch 217 engages the first optic element engagement 226 and the optic element latch 222 engages the second optic element engagement 227. Thereby, the optic element 225 may be, for example, removably secured proximate the substrate 205.

The clips 215, 220 may be constructed to accommodate, for example, a standard "pick and place" robot that may automatically adhere the clips 215, 220 to the substrate 205. When an electrically conductive material (e.g., led/tin solder) is used, for example, to secure the clips 215, 220 to the substrate 205, the clips 215, 220 may be an active part of an associated electrical circuit. For example, the clips 215, 220 may provide an electrical wiring path to edge connections on an optic element (or compound optic element) to, for example, activate photo-optical coatings in the optic element. Thus, the clips 215, 220 may be used for controlling an optical density or optical filtering properties in the optic element. For example, silicone optic element compounds (e.g., class MS1002 silicon) may be doped with optically active nanoparticles such that an associated optic element may be tuned to selectively refract light and change a refractive index of the optic element (i.e., a stimulus for controlling a refractive index of an optic element may be delivered through circuit-board clip-mounting connections as a tuned electrical current which may activate dopants diffused throughout a particular silicone optic element layer). Alternatively, or additionally, a "liquid-optic element" may be physically altered to change, for example, an optical element focal length using an electrical signal conducted to the liquid-optic element through the clips 215, 220.

When configured as illustrated and described with regard to FIG. 2, the clips 215, 220 may function as a heat sink and thermal energy radiator to cool the light source 210 (e.g., a high temperature LED) while simultaneously isolating the optic element 225 from being physically connected (using adhesives for example) to the hot L.E.D.'s base. For example, an air-gap may be created between the optic element 225 and the light source 210. Additionally, a thin layer of alumina, for example, may be used to thermally isolate the optic element engagements 226, 227 from the respective clip latch 217, 222. In a more complex configuration, the clips 215, 220 may include cooling fins to increase an associated heat radiating surface. Such a configuration may, for example, cool associated copper-traces at a base of the light source 210 mounting, and may add to an overall thermal dissipation of the light source 210.

Figure 3:
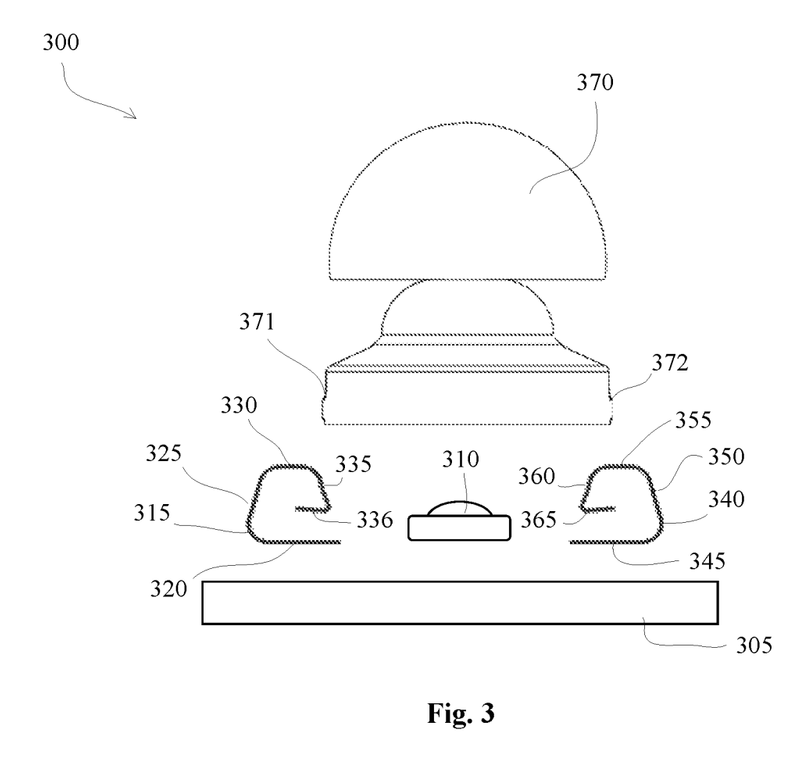
FIG. 3 depicts an exploded, profile, view of an example assembly including a compound optic element secured to a circuit board via spring clips.

Turning to FIG. 3, an exploded view of an example optic element mounting system 300 is illustrated. The example optic element mounting system 300 may include an optic element 370 proximate a light source 310 which, in turn, is proximate a substrate 305. The example optic element mounting system 300 may include a first clip 315 and a second clip 340. The optic element mounting system 300 may be similar to, for example, either the optic element mounting system 100 of FIG. 1 or the optic element mounting system 200 of FIG. 2. The optic element 370 may include a first optic element engagement 371 and a second optic element engagement 372. The first clip 315 may include a clip mounting foot 320 for adhering the first clip 315 to the substrate 305, spring loaded sections 325, 330, 335, and an optic element latch 336 configured to interact with the first optic element engagement 371. Similarly, the second clip 340 may include a clip mounting foot 345 for adhering the second clip 340 to the substrate 305, spring loaded sections 350, 355, 360, and an optic element latch 365 configured to interact with the second optic element engagement 372. The substrate 305, the light source 310, the first clip 315, the second clip 340, and the optic element 370 may be assembled as reflected in FIGS. 1 and 2.

Figure 4:
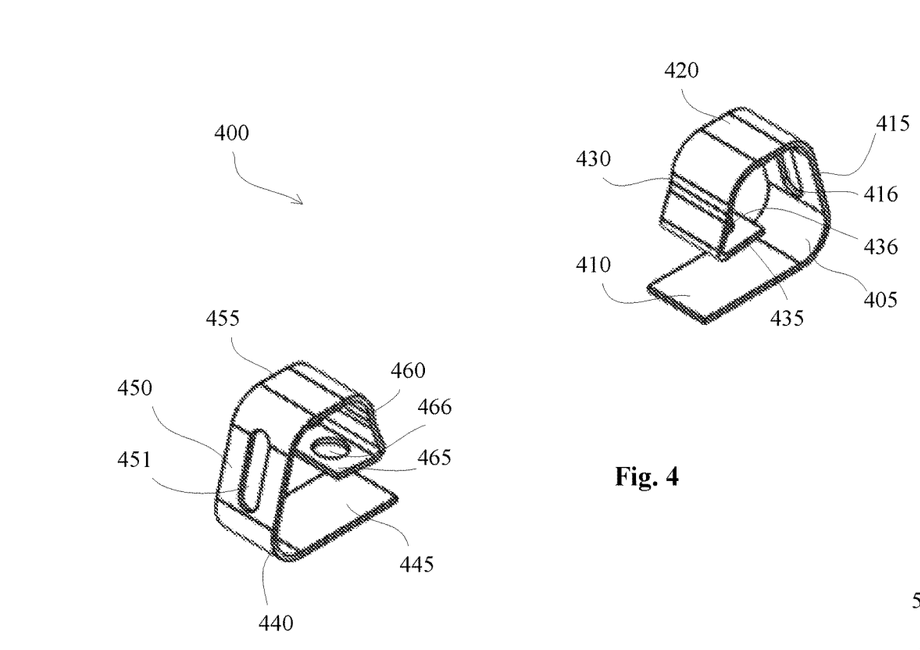
FIG. 4 depicts a perspective view of example spring clips.

With reference to FIG. 4, a perspective view of an example optic element mounting system 400 is illustrated. The example optic element mounting system 400 may be similar to portions of the optic element mounting systems 100, 200, 300 of FIGS. 1, 2 and 3, respectively. In particular, the optic element mounting system 400 may include a first clip 405 and a second clip 440. The first clip 405 may include a clip mounting foot 410, a first spring loaded section 415 having a first aperture 416, a second spring loaded section 420, a third spring loaded section 430, and an optic element latch 435 having a second aperture 436. Similarly, the second clip 440 may include a clip mounting foot 445, a first spring loaded section 450 having a first aperture 451, a second spring loaded section 455, a third spring loaded section 460, and an optic element latch 465 having a second aperture 466.

Figure 5:
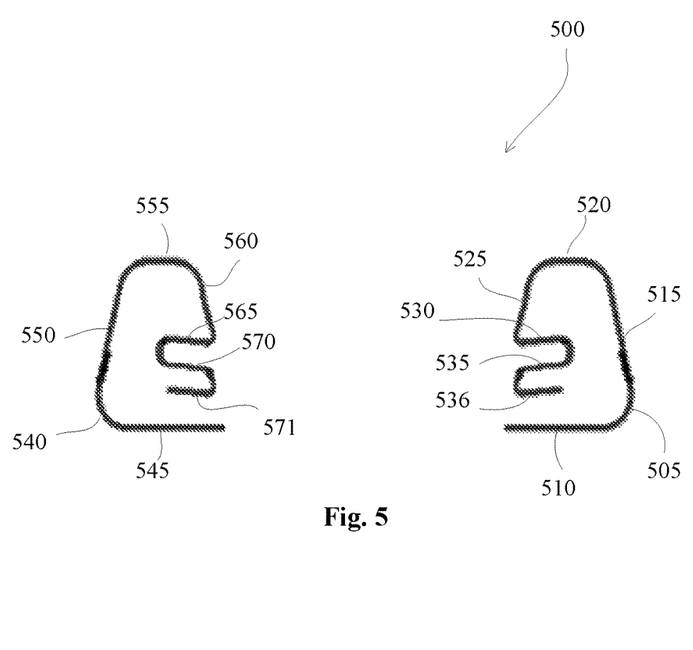
FIG. 5 depicts a perspective view of example spring clips.
Figures 6A, 6C, 6D, 6E:
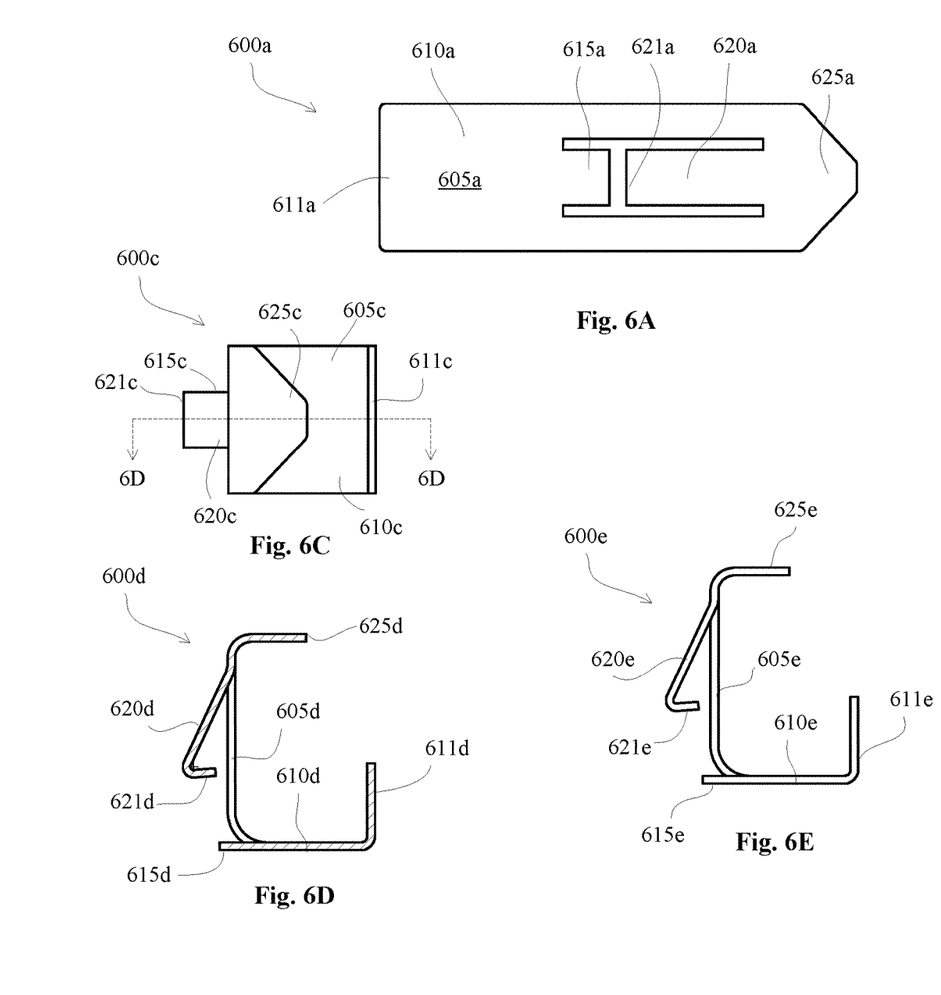
FIGS. 6A-6F depict various views of an example spring clip.
Figure 6B:
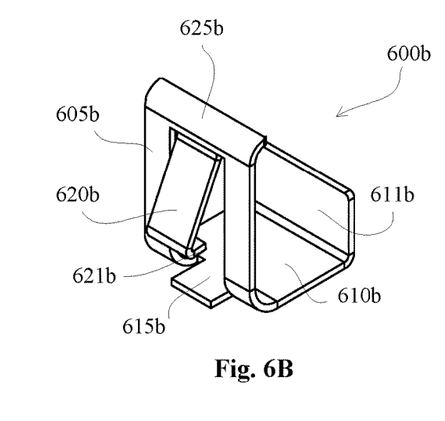
Figure 6F:
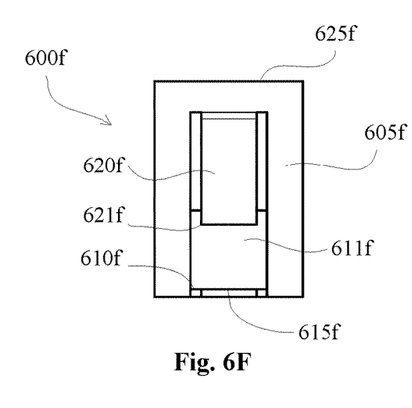

Turning to FIG. 5, an example optic element mounting system 500 may include a first clip 505 and a second clip 540. The example optic element mounting system 500 may be similar to portions of the optic element mounting systems 100, 200, 300 of FIGS. 1, 2 and 3, respectively. The first clip 505 may include a clip mounting foot 510, spring loaded sections 515, 520, 525, a first optic element capture point defined between the surfaces 530, 535, and a second optic element capture point defined between the surface 536 and the clip mounting foot 510. Similarly, the second clip 540 may include a clip mounting foot 545, spring loaded sections 555, 560, 565, a first optic element capture point defined between the surfaces 565, 570, and a second optic element capture point defined between the surface 570 and the clip mounting foot 545. Thus, the clips 505, 540 may facilitate adjustment of a height and/or a tilt of an associated optic element relative to an associated light source, light sensor, and/or substrate. The optic element mounting system 500 may, for example, allow for customizing light distribution patterns in outdoor lighting, sign-lighting, or architectural and landscape lighting design.

While both FIGS. 4 and 5 illustrate specific shape clips, any given clip may include any shape, and an associated optic element mounting system may include any number of clips to secure an optic element relative an associated light source, light sensor, and/or associated substrate. For example, two, three, four, or more clips may be used to hold an associated optic element. A clip may be designed to wrap around an optic element. A clip may include an arc shape profile to hold and/or contain an optic element in a desired position.

With reference to FIGS. 6A-6F, a clip 600a-f may include a clip body 605a-f having a clip mounting foot 610a-f, a vertical portion 611a-f, a clip stabilizing tab 615a-f, a pivotal optic element latch 620a-f having an optic element catch 621a-f, and an upper optical element guide portion 625a-f. The clip 600a-f may be incorporated within any one of the optic element mounting systems 100, 200, 300, of FIGS. 1, 2 and 3, respectively, in lieu of, or in addition to the clips as illustrated in FIGS. 1, 2 and 3.

Figure 7:
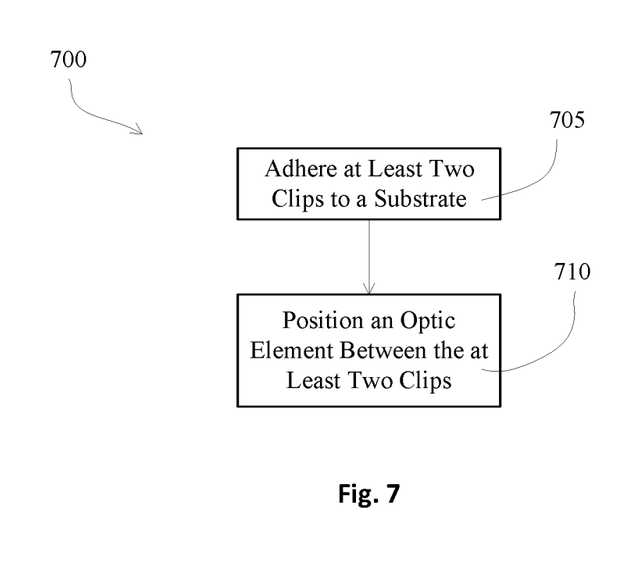
FIG. 7 depicts a flow diagram of an example method of securing an optic element to a substrate.

Turning to FIG. 7, a method of manufacturing an optical element mounting system 700 may include adhering at least two clips to a substrate (block 705). A method of manufacturing an optical element system may include adhering at least two clips to a substrate (block 705) and positioning an optical element between the at least two clips (block 710). The method of manufacturing an optical element mounting system 700 may result in any one of the optical element mounting systems 100, 200, 300, 400, 500. Any one of the clips, as illustrated in FIGS. 1-6F may be incorporated in the method 700.

A clip may be spring loaded such that an associated optical element may be inserted and removed as desired. A clip may be placed proximate, and adhered to, an associated printed circuit board by standard printed circuit board surface mount "pick n place" assembly machines. For example, a clip may be soldered onto a standard printed circuit board.

As described above, subsequent to adhering at least two clips to an associated substrate (e.g., a printed circuit board), an optical element may be inserted between the clips, and may be held in place by the clips. As further described, use of clips to secure an optical element to a substrate may eliminate the need for adhesives, complex snap-in assemblies, optic element holders, pressure fit optic within a holder, etc. Moreover, use of clips may provide for alignment of optics elements, thereby, eliminating the need for pins that are needed for alignment of optic elements in the prior art. Yet further, use of clips to secure an optic element to a printed circuit board may eliminated locking pins that are required in the prior art.

In accordance with above, use of clips to secure an optic element to a substrate may provide less complex manufacturing methods, thus, may reduce associated assembly time and cost. Furthermore, metal clips may have additional benefits, such as heat sinking capability for higher temperature illuminating sources (e.g., light emitting diodes). Moreover, use of clips may impart shock absorbing capabilities, thereby, allowing for higher associated vibration and/or G-forces.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. An optic element mounting system, comprising:
   a printed circuit board; and
   at least two clips adhered to the printed circuit board, wherein the at least two clips are configured to receive an optic element between the at least two clips and to secure the optic element proximate to the printed circuit board, and wherein the at least two clips are further configured to align the optic element over at least one of: a light source or a camera, wherein the at least one of: the light source or the camera is adhered to the printed circuit board.

2. The optic element mounting system of claim 1, wherein the at least two clips are soldered to the printed circuit board.

3. The optic element mounting system of claim 2, wherein a soldered base of at least one of the at least two clips electrically connects the clips and the optic element to an embedded electrical circuit in the printed circuit board.

4. The optic element mounting system of claim 2, wherein a soldered base of at least one of the at least two clips defines a thermal energy conductor for cooling at least one of: a light emitting diode, or a camera.

5. The optic element mounting system of claim 4, wherein at least one of the at least two clips is at least one of: fluid cooled, or convection cooled, and wherein the fluid cooled includes at least one of: circulating air, or liquid cooling.

6. The optic element mounting system of claim 2, where the optic element is a high temperature optic element made of silicone for use in a high power machine vision illumination system.

7. The optic element mounting system of claim 1, wherein multiple notches are formed in a vertical axis of at least one of the at least two clips to allow for adjusting at least one of: a height of the optic element above the printed circuit board, or an asymmetrical tilt between a surface of the optic element and a vertical radiation direction of an associated light source to change a principal axis of radiation of an illumination emission of a combined optic element and the light source.

8. An optic element mounting system as in claim 1, wherein at least one of the at least two clips comprising:
   a mounting foot for securing the clip to a substrate via solder;
   at least one spring loaded portion, wherein the spring loaded section is configured to deflect in position as the optic element is positioned proximate the clip; and
   an optic element latch, wherein the optic element latch is configured to engage an optic element engagement of the optic element.

9. The optical element mounting system of claim 8, further comprising:
   at least two optic element capture points, wherein the at least two optic element capture points facilitate adjustment of a height of the optic element.

10. The optical element mounting system of claim 8, further comprising:

at least two optic element capture points, wherein the at least two optic element capture points facilitate adjustment of a tilt of the optic element.

11. The optical element mounting system of claim 8, wherein the at least one spring loaded portion includes at least one aperture.

12. The optical element mounting system of claim 8, wherein the clip is manufactured of either spring steel or spring metal.

13. The optical element mounting system of claim 8, wherein the optical element latch is pivotally attached to the clip.

14. The optical element mounting system of claim 8, further comprising:
   an optical element guide, wherein the optical element guide is configured to guide the optical element toward the optical element latch.

15. A method of manufacturing an optical element mount as in claim 1, the method comprising:
   adhering at least one of the at least two clips to the printed circuit board with solder, wherein the at least two clips are configured to secure the optical element proximate the printed circuit board.

16. A method as in claim 15, wherein at least one of the at least two clips comprising:
   a mounting foot for securing the clip to the printed circuit board;
   at least one spring loaded portion, wherein the spring loaded section is configured to deflect in position as the optic element is positioned proximate the clip; and
   an optic element latch, wherein the optic element latch is configured to engage an optic element engagement of the optic element.

17. A method as in claim 15, wherein the at least two clips are soldered to the printed circuit board.

18. A method as in claim 15, wherein the printed circuit board includes an embedded electrical circuit.

19. A method as in claim 15, wherein a soldered base of at least one of the at least two clips defines a thermal energy conductor for cooling at least one of: a light emitting diode, or a camera.

20. A method as in claim 15, wherein a soldered base of at least one of the at least two clips electrically connects the clips and the optic element to an embedded electrical circuit in the printed circuit board.

* * * * *